United States Patent [19]

Wiesmann et al.

[11] Patent Number: 4,866,738
[45] Date of Patent: Sep. 12, 1989

[54] CIRCUIT AND METHOD FOR DERIVING THE WORD TIMING OF A PULSE POSITION MODULATED SIGNAL

[75] Inventors: Theo Wiesmann; Wolfgang Steinert, both of Backnang; Jürgen Müller, Waiblingen; Nöldeke, Fellbach, all of Fed. Rep. of Germany

[73] Assignee: ANT Nachrichtentechnik GmbH, Backnang, Fed. Rep. of Germany

[21] Appl. No.: 239,176

[22] Filed: Aug. 31, 1988

[30] Foreign Application Priority Data

Sep. 25, 1987 [DE] Fed. Rep. of Germany ....... 3732287

[51] Int. Cl.$^4$ .............................................. H04K 9/04
[52] U.S. Cl. ..................................... 375/23; 329/313; 455/608; 370/10
[58] Field of Search ............................. 375/23.76, 102; 455/608; 340/825.64; 329/107; 370/10; 328/109; 307/234

[56] References Cited

U.S. PATENT DOCUMENTS

| | | | |
|---|---|---|---|
| 3,852,718 | 12/1974 | De Lyria | 340/825.6 X |
| 4,206,316 | 6/1980 | Burnswig et al. | 375/23 |
| 4,357,634 | 11/1982 | Chung | 375/23 |
| 4,527,276 | 7/1985 | Gutleber | 329/107 |
| 4,584,720 | 4/1986 | Garrett | 375/23 |
| 4,648,133 | 3/1987 | Vilnrotter | 455/608 |
| 4,656,431 | 4/1987 | Chapman | 329/107 |

OTHER PUBLICATIONS

Gee L. Lui et al., "On Joint Symbol and Frame Synchronization for Direct-Detection Optical Communication Systems," IEEE Transactions on Communications, vol. COM-35, No. 2 (Feb., 1987) pp. 250-255.

Costas N. Georghiades, "Joint Baud and Frame Synchronization in Direct Detection Optical Communication," IEEE Transactions on Communications, vol. COM—33, No. 4 (Apr., 1985) pp. 357-360.

Costas N. Georghiades, "Optimum Joint Slot and Symbol Synchronization for the Optical PPM Channel," IEE Transactions on Communications, vol. COM-35, No. 6 (Jun., 1987) pp. 632-636.

*Primary Examiner*—Robert L. Griffin
*Assistant Examiner*—Stephen Chin
*Attorney, Agent, or Firm*—Spencer & Frank

[57] ABSTRACT

A method of deriving the word timing or word boundaries of a PPM signal, without requiring a synchronizing marker to be added to the PPM signal, employs a bipolar evaluation signal which begins at any time slot of the PPM signal. The evaluation signal is multiplied repeatedly with successive portions of the PPM signal within a time frame of the PPM signal which extends over a plurality of word lengths, and the product signals are integrated. Such repeated multiplications with subsequent integration are performed a number of times, with the evaluation signal being offset by one time slot each time. The time position of the evaluation signal which, after repeated multiplication and integration, produces the smallest possible signal, is considered to be in phase synchronism with the word timing of the PPM signal.

12 Claims, 4 Drawing Sheets

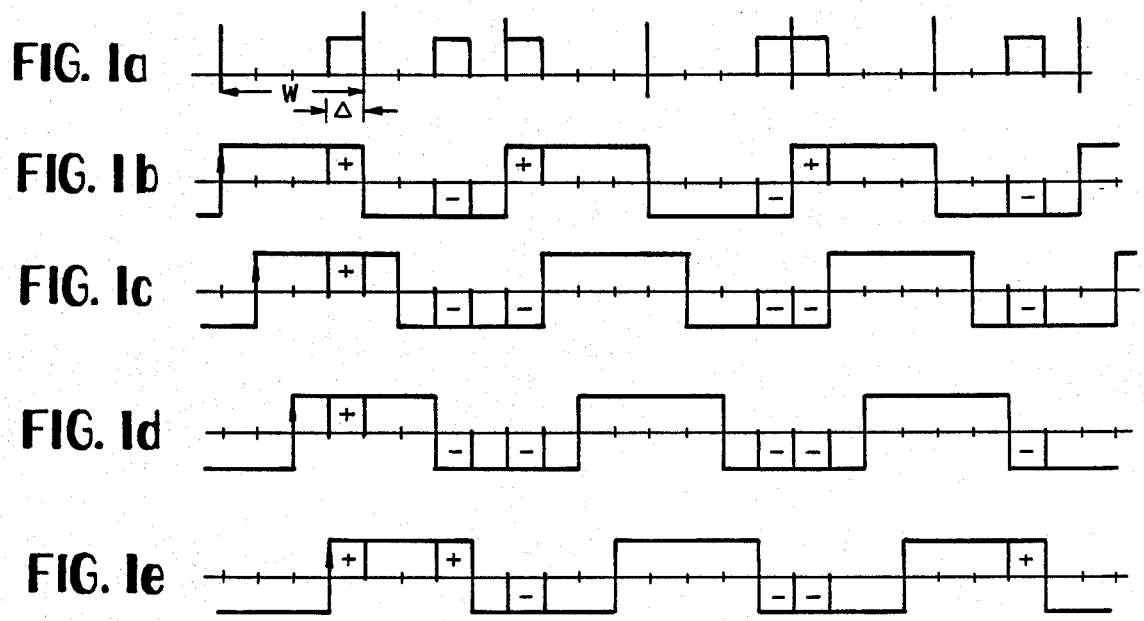
FIG. 1a
FIG. 1b
FIG. 1c
FIG. 1d
FIG. 1e
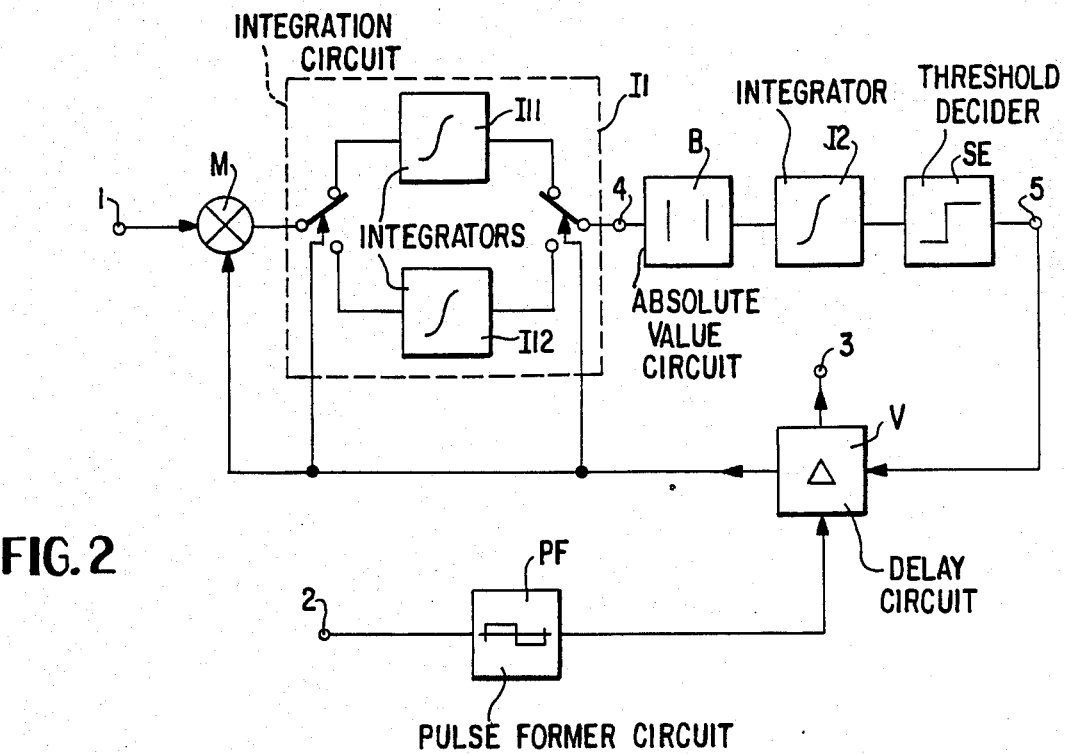
FIG. 2

CIRCUIT AND METHOD FOR DERIVING THE WORD TIMING OF A PULSE POSITION MODULATED SIGNAL

BACKGROUND OF THE INVENTION

The present invention relates to a method for deriving the word timing of a pulse position modulated signal in which each word is subdivided into a plurality of time slots and a pulse occurs in any one of the time slots of every word. The phrase "deriving the word timing" as used herein means determining the boundaries of the words in the PPM signal, or where one word stops and the next word begins. The invention also relates to circuitry for implementing the method.

To be able to derive the word timing from a received pulse position modulated signal and to be able to synchronize the demodulator with the word timing, in accordance with a customary method at least one synchronizing word from which the word timing can be derived is inserted into the pulse position modulated (PPM) signal at the transmitting end. At the receiving end, this synchronizing word may then be detected by employing the maximum likelihood method of synchronization as disclosed, for example, by Costas N. Georghiades, "Joint Baud and Frame Synchronization in Direct Detection Optical Communications," IEEE Transactions on Communications, Vol. COM-33, No. 4 (April, 1985) pages 357–360 or by Costas N. Georghiades, "Optimum Joint Slot and Symbol Synchronization for the Optical PPM Channel," IEEE Transactions on Communications, Vol. COM-35, No. 6 (June, 1987) pages 632–636.

SUMMARY OF THE INVENTION

It is an object of the present invention to provide a method for deriving the word timing of a pulse position modulated signal which does not require that synchronizing words be included in the pulse position modulated signal, and which nevertheless permits error-free derivation of the word timing with minimum expenditures for circuitry.

In accordance with one aspect of the invention, a method for deriving the word timing of a PPM signal, in which each word or symbol is subdivided into a plurality of time slots and a pulse occurs in any of the time slots of a word, is characterized in that a bipolar evaluation signal is generated. The bipolar evaluation signal begins in synchronization with any time slot and has a period which corresponds to an even number multiple of the word length. The evaluation signal and the PPM signal are multiplied repeatedly, and successively in time, within a time frame which extends over a plurality of word lengths. The product signals resulting from the repeated multiplications are integrated. Then the absolute values of the signals resulting from the integrations of the product signals are integrated. The signals resulting from the last integration are subjected to a threshold decision. If the signals lie below a threshold, the position of the evaluation signal is considered to be in synchronism with the word timing of the PPM signal. However, if the signal lies above the threshold, the evaluation signal is shifted by one time slot with respect to the PPM signal and the procedure is repeated, with the shift of the evaluation signal by a further time slot and the subsequent repetitions of the procedure continuing until a signal is found which lies below the threshold.

In accordance with another aspect of the invention, the repeated multiplication of the evaluation signal and the PPM signal, the integration of the resulting product signals, and the integration of the absolute values of the integrated signals may be conducted as a plurality of parallel procedures. In this case, the repeated multiplications are started beginning at a different time slot in each procedure. The signals resulting from the final integrations in all of the procedures are compared with one another, and the time position of the evaluation signal which is associated with that procedure which produces the signal having the lowest level is considered to be in synchronism with the word timing of the PPM signal.

BRIEF DESCRIPTION OF THE DRAWINGS

FIG. 1a is a pulse diagram illustrating an example of a pulse position modulated signal.

FIGS. 1b through 1e are pulse diagrams illustrating the PPM signal of FIG. 1a multiplied by a bipolar evaluation signal, the bipolar evaluation signal being shown at different phase positions with respect to the word boundaries of the PPM signal.

FIG. 2 is a block diagram of a circuit for deriving the word timing of a PPM signal in accordance with an embodiment of the present invention.

DESCRIPTION OF THE PREFERRED EMBODIMENTS

Figure 3:
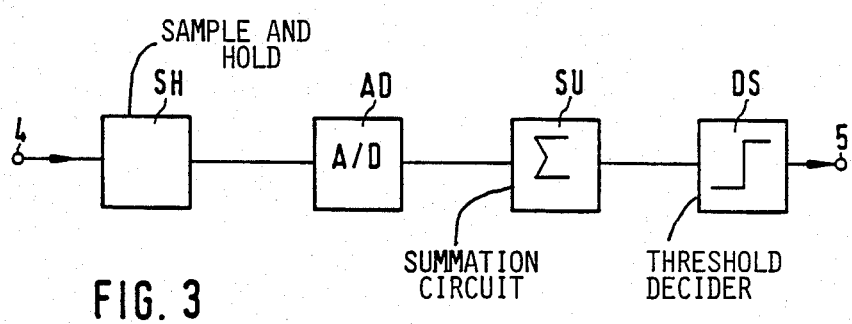
FIG. 3 is a block diagram illustrating digital circuitry which can be used in lieu of a portion of the circuitry of FIG. 2.

FIG. 1a is a pulse diagram illustrating an example of a pulse position modulated signal. In English-language literature, pulse position modulation is abbreviated as M-PPM, with M indicating the number of possible positions or time slots within a word in which a pulse can occur. The pulse position modulated signal shown in FIG. 1a is a 4-PPM signal, since each word (of length w) is divided into 4 time slots (of width $\Delta$).

The basic circuit diagram of FIG. 2 will be used for explaining a method in accordance with the present invention for deriving the word timing for a 4-PPM signal. However the method can be employed quite generally for an M-PPM signal, where M is equal to or greater than two.

In FIG. 2, a pulse position modulated or PPM signal is fed to an input 1 of an analog multiplier M. A so-called evaluation signal is fed to a second input of multiplier M. This evaluation signal is generated from a slot timing signal at input 2 of the circuit. Such a slot timing signal can be derived in a customary manner, for example with the aid of a phase regulating loop. From the slot timing signal, a pulse former circuit PF forms a bipolar evaluation signal whose period or duration corresponds to twice the word length of the PPM signal, i.e., in the present example, eight times the time slot width Δ. The evaluation signal is present at the output of pulse former circuit PF and has a rising edge which corresponds precisely with the beginning of one of the time slots of the PPM signal. Although not illustrated, the pulse former circuit PF may be made from a counter, a toggle flip flop, and a comparator. The counter receives the slot timing signal, which has a pulse marking the beginning of each time slot of the PPM signal, and toggles the flip flop every fourth pulse of the slot timing signal. The counter is also reset to zero every fourth pulse. The comparator is connected to the flip flop, and produces a positive valve (nominally +1 volt) when the output of the flip flop is in one state and a negative value (nominally −1 volt) when the output of the flip flop is in the other state. The result is a symmetrical bipolar signal having a period corresponding to the duration of eight time slots. The evaluation signal travels via a delay circuit V to the second input of analog multiplier M. Delay circuit V is controlled in such a manner that it delays the evaluation signal by n times (n=0, 1, 2, . . .) the time slot width. Initially, delay circuit V forwards the evaluation signal furnished by pulse shaper circuit PF without a delay (0·Δ).

FIG. 1b illustrates the multiplication of the undelayed bipolar evaluation signal with the PPM signal. It will be seen that a PPM signal pulse which occurs during the positive half period of the evaluation signal remains positive and that a PPM signal pulse which occurs during the negative period half is inverted. Under the conditions shown in FIG. 1b, where the evaluation signal begins in phase synchronism with a word of the PPM signal, one PPM signal pulse occurs during each negative half period of the evaluation signal and one PPM signal pulse occurs during each positive half period. Since multiplication of the bipolar evaluation signal with the PPM signal results in one positive pulse and one negative pulse, integration of the product signal over the entire period or duration of the evaluation signal (here, 8·Δ) results in a signal having the level "0". However, deviations from the signal level "0" occur if an evaluation signal which does not begin in phase synchronism with a word of the PPM signal is multiplied with the PPM signal and the product is integrated. Examples showing the evaluation signal when it is not in phase synchronism with the words of PPM signal (that is, the rising and falling edges of the evaluation signal do not lie on word boundaries) are shown in FIGS. 1c through 1e. In these Figures different numbers of pulses of the PPM signal occur during the two half periods of the evaluation signal, and since the integration extends over the entire period of the evaluation signal the result of the integration always furnishes a signal other than "0". Accordingly, the conclusion can be drawn that a zero signal as the result of the integration of the product signal indicates that the evaluation signal begins with a word of the PPM signal and thus the word timing of the PPM signal is synchronized with the evaluation signal. On the other hand if the result of the integration is other than a zero signal, the evaluation signal is not in phase synchronism with the word timing of the PPM signal.

In practice, however, the integrated product signal will deviate from "0" even if there is phase synchronism because the PPM signal always contains noise. Due to the noise, the pulses occurring during the evaluation signal do not all contain the same signal energy. Thus, integration of only one product signal cannot provide reliable information on whether the deviation from a zero signal is the result of noise in the PPM signal or is due to the absence of phase synchronism between the evaluation signal and the word timing of the PPM signal. To exclude this source of errors, the PPM signal is multiplied with the evaluation signal several times in succession (see FIGS. 1b through 1e) and each product signal is integrated, as described above, in an integration circuit I1. Then, each of the integrated product signals is supplied to absolute value circuit B. Thereafter, an integrator I2 integrates the absolute values of all signals resulting from the first integration and finally the signal resulting therefrom is fed to a threshold decider SE, which may be a comparator. If the signal formed by the last integrator I2 lies below the threshold given by threshold decider SE, a reliable conclusion can be drawn that the evaluation signal is in phase synchronism with the word timing of the PPM signal. In this case, the evaluation signal at output 3 of the delay circuit V is supplied to other circuitry (not illustrated) for use in demodulating the PPM signal. If the output signal of integrator I2 exceeds the threshold, phase synchronism does not exist and the evaluation signal is again repeatedly multiplied with the PPM signal according to the procedure described above. In that case, however, threshold decider SE causes delay circuit V to change the delay of the evaluation signal to multiplier M by one time slot Δ. The result is that the renewed repeated multiplication takes place in a time frame of the PPM signal which is offset by a time slot Δ compared to the preceding repeated multiplication. This repeated multiplication with the evaluation signal, each time delayed by a further time slot Δ (see FIGS. 1b to 1c), is repeated until the output signal of the second integrator I2 lies below the threshold of the threshold decider SE.

The absolute value circuit B is employed because the integrated product signals may have different signs in the course of repeated multiplication, and therefore integration of these output signals with different signs in the first integration device I1 may produce a signal that lies below the given threshold even though the evaluation signal is not in phase synchronism with the word timing of the PPM signal. Moreover, it must be noted that if a sequence of identical words appears in the PPM signal and if the evaluation signal during repeated multiplication detects, in particular, the pulses of this sequence of words, the output signal of the second integrator I2 will always lie below the threshold of threshold decider SE although no phase synchronism exists. To obtain the correct information about phase synchronism in such cases, the evaluation signal must be multiplied with the PPM signal over more successive word lengths in each repeated multiplication than the absolute maximum number of identical words that can appear in immediate succession in the PPM signal.

Threshold decider SE may be designed so that it changes its threshold adaptively as a function of the number of multiplications to be performed in succession and in dependence on the noise power superposed on the PPM signal.

Advisably, integration circuit I1 is composed of two parallel connected integrators I11 and I12. They alternatingly integrate the successive product signals coming from multiplier M, i.e., one integrator performs the integration of a product signal while the other integrator transfers the result of its integration of the preceding product signal to the subsequent circuit units and is then reset.

In the embodiment shown in FIG. 2, the further processing of the integrated product signals is performed in an analog manner. However, digital signal processing is also possible here. For this purpose, the circuitry between terminal points 4 and 5 may be replaced, for example, by the circuitry shown in FIG. 3. Thus the integrated product signals made available at the output of integration circuit I1 are sampled in a sample-and-hold circuit SH, then the sampled values are converted to digital signals in an analog/digital converter AD and the digital signals are added in a digital summation circuit SU. Finally, the result of the digital addition originating from repeated multiplication is compared with a threshold in a digital threshold decider DS.

Figure 4:
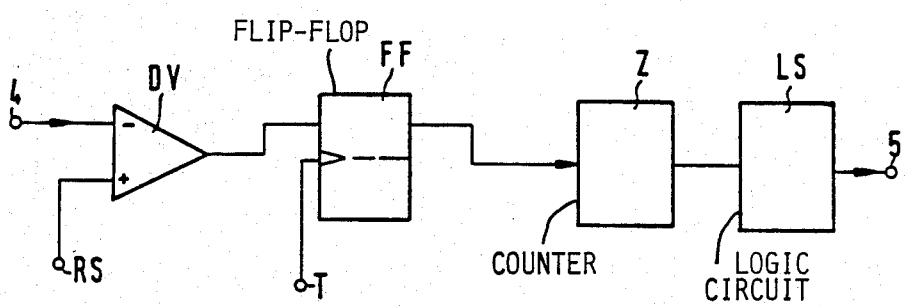
FIG. 4 is a block diagram illustrating alternative digital circuitry which can be used in lieu of a portion of the circuitry of FIG. 2.

Another variation of further processing of the output signals from integration circuit I1 is illustrated schematically in FIG. 4. Here, each analog output signal from integration circuit I1 is compared in a comparator, e.g. a differential amplifier DV, with a reference signal RS. If an output signal from integration circuit I1 exceeds the reference signal, i.e., the two half periods of the bipolar evaluation signal did not cover the same number of pulses of the PPM signal during the multiplication performed before the integration (see FIGS. 1c to 1e), a flip flop circuit FF which receives the evaluation signal at clock input terminal T is set to "1". All "1" pulses of flip flop circuit FF appearing during repeated multiplication of the evaluation signal with the PPM signal are counted by a counter Z. Finally, a logic circuit LS such as a digital comparator compares the number of "1" pulses recorded in counter Z with a threshold number. If the threshold number is exceeded by the number of "1" pulses, the position of the evaluation signal multiplied with the PPM signal is not considered to be in phase synchronism with the word timing of the PPM signal. The situation is different if the number of "1" pulses lies below the threshold number; then synchronism does exist.

In the above-described method, all repeated multiplication processes required to determine the phase-synchronous position of the evaluation signal, including integration and threshold decision, have been performed serially in succession. An alternative to this is parallel signal processing. In that case, the already described method steps from repeated multiplication through the two integrations to the threshold decision are performed in several procedures taking place in parallel. In modification of FIG. 2, a circuit for performing the parallel procedures would then have a plurality of parallel circuit branches of which each circuit branch may be designed similarly to the circuit branch used between connecting terminals 1 and 5 and shown in the circuit embodiment of FIG. 2, and in its modifications shown in FIGS. 3 and 4 but without the analog threshold decider SE or the digital threshold decider DS or the logic circuit LS, respectively. Such a circuit arrangement design can be easily be derived from the circuits shown in FIGS. 2, 3 and 4 by simply connecting in parallel the circuit branches provided there. For each one of the parallel procedures, the multipliers of the parallel circuit branches receive the evaluation signal in a time offset by one time slot of the PPM signal so that the repeated multiplications of the evaluation signal extend in each one of the parallel circuit branches over a different time frame of the PPM signal.

The signals resulting from the parallel procedures are compared with one another, and the time position of the evaluation signal associated with that procedure which produced the signal with the lowest level is considered to be synchronized with the word timing of the pulse position modulated signal. This comparison of the signals is performed in a comparison circuit which is connected to the outputs of the parallel circuit branches.

A system employing parallel circuit branches as discussed above is illustrated in FIG. 5. Input terminal 50 receives the slot timing signal, and pulse former circuit 52 generates the bipolar evaluation signal and delivers it to delay circuit 54. Delay circuit 54 includes three delay members 56 connected in series. Each delay member 56 imposes a delay having a duration corresponding to one slot width $\Delta$ of a 4-PPM signal. Accordingly, it will be apparent that conductor 58 conveys the evaluation signal in is un-delayed state (that is, with a delay of $n\Delta$, where $n=0$). Conductor 60 conveys the evaluation signal with a delay corresponding to one slot width (that is, $n\Delta$, where $n=1$). Similarly, conductors 62 and 64 respectively convey the evaluation signals at delays corresponding to two and three times the width. As a result, each of the four slots in a word as shown in FIG. 1a corresponds to the signal on one of the conductors 58–64.

The 4-PPM signal is applied to input terminal 66, which distributes it to an input port of each of mixers 68, 70, 72, and 74. The uppermost of the parallel circuit branches shown in FIG. 5 includes mixer 68 along with integration circuit 76, absolute value circuit 78, and integrator 80. The mixer 68 of this uppermost circuit branch receives the evaluation signal via conductor 58. The circuit branch operates in a manner similar to that discussed above with respect to FIG. 2. The next branch circuit shown in FIG. 5 includes mixer 70, integration circuit 82, absolute value circuit 84, and integrator 86. This second circuit branch receives the evaluation signal (once delayed) via conductor 60. The circuit of FIG. 5 includes two additional branches as illustrated.

Figure 5:
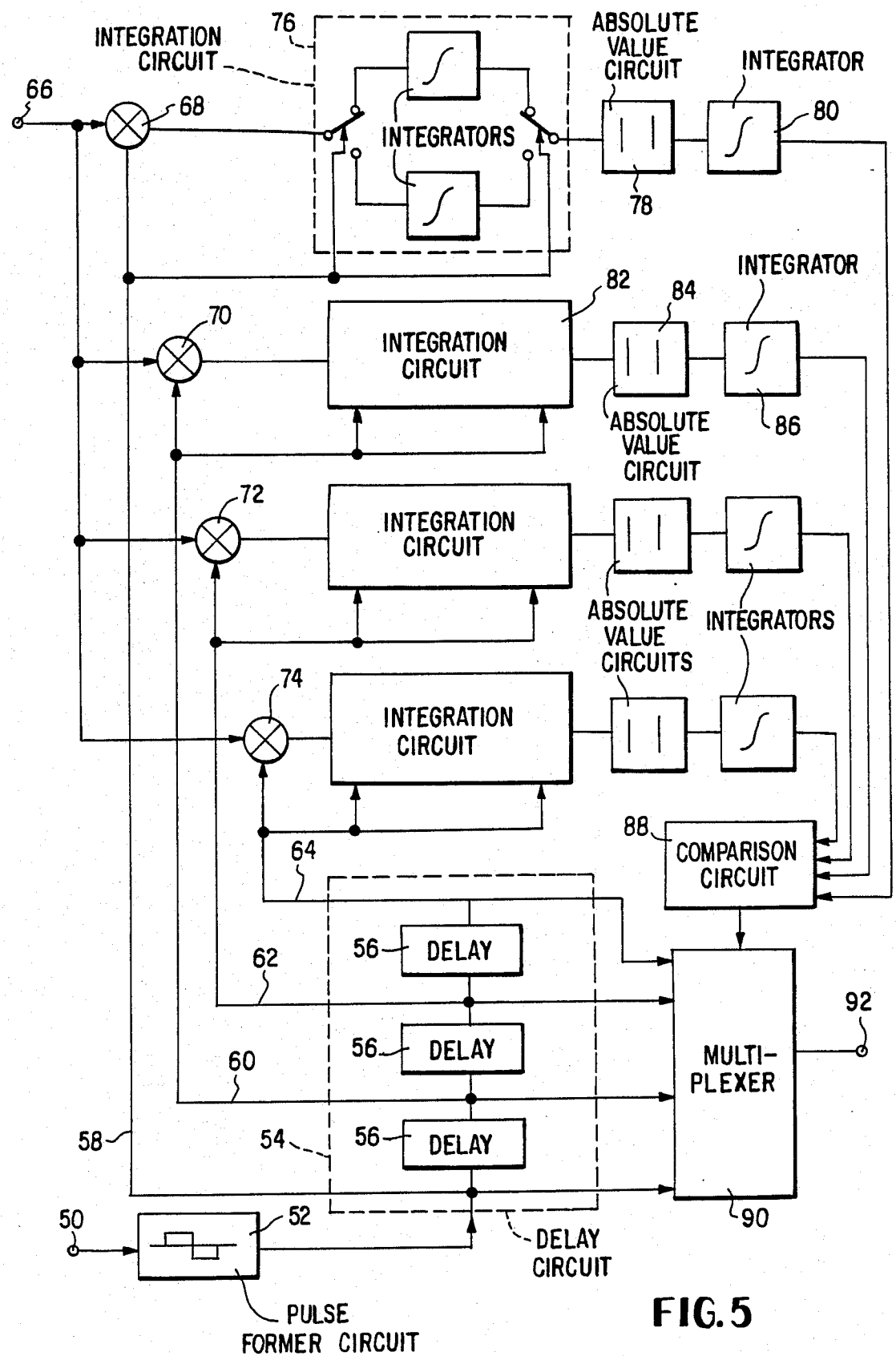
FIG. 5 is a block diagram of a circuit for deriving the word timing of a PPM signal in accordance with an embodiment of the invention which employs parallel circuit branches.

With continuing reference to FIG. 5, comparison circuit 88 receives the output signals from the final integrators in each of the circuit branches. Comparison circuit 88 determines which of the values it receives is lowest, and provides a 2-bit output signal to analog multiplexer 90 which identifies the circuit branch having the output with the lowest value. Multiplexer 90 then connects the appropriate one of conductors 58–64 to output terminal 92. For example, if the output of integrator 80 in the uppermost circuit branch is the lowest, the un-delayed evaluation signal appears at terminal 92. If the output of integrator 86 in the next circuit branch is lowest, the once-delayed evaluation signal on conductor 60 appears at terminal 92.

Figure 6:
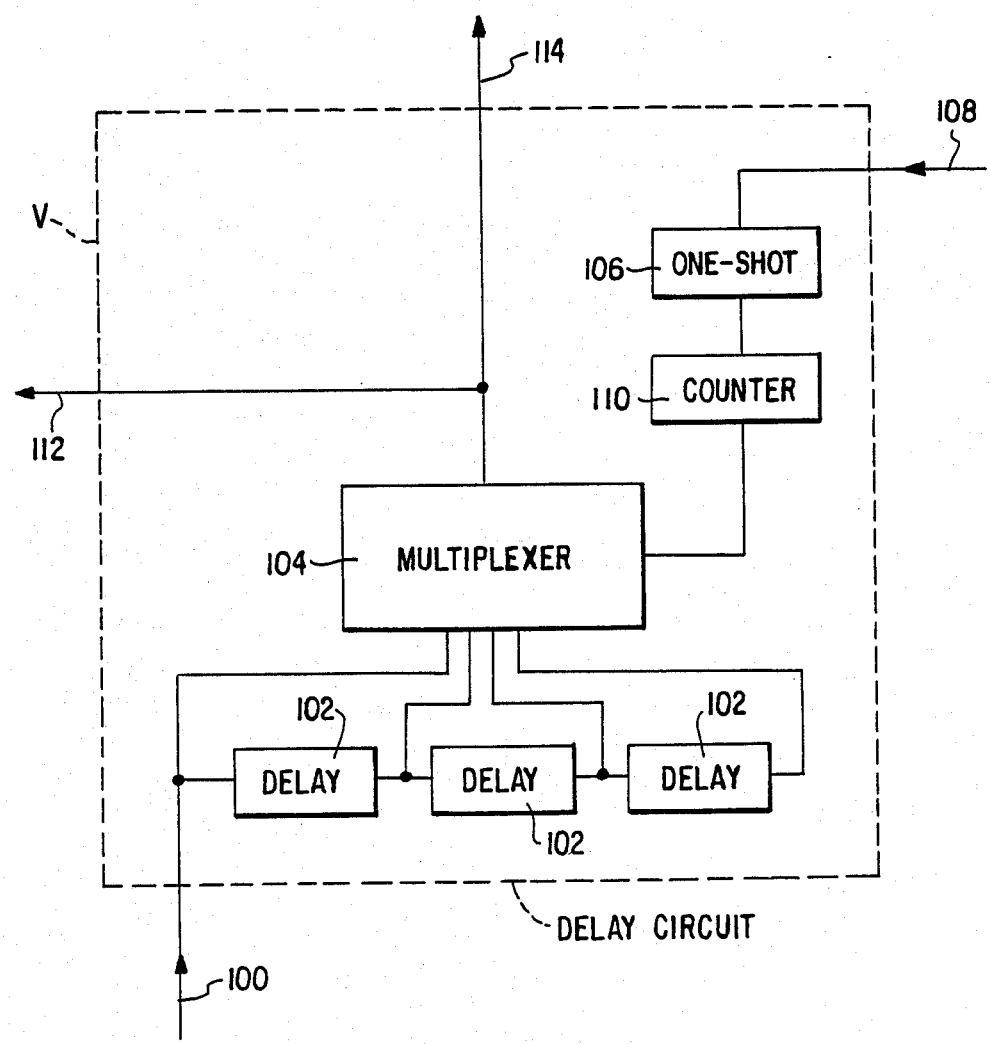
FIG. 6 is a block diagram illustrating a delay circuit which can be used in the embodiment of FIG. 2.

FIG. 6 illustrates circuitry which can be employed for delay unit V of FIG. 2. With reference to both FIGS. 2 and 6, delay unit V receives the bipolar evaluation signal via conductor 100 and distributes the signal to three delay members 102 which are connected in series. The delay imposed by each of units 102 corresponds to the duration $\Delta$ of one time slot. As a result, the four input signals received by analog multiplexer 104 correspond to the evaluation signal delayed by $n\Delta$, where $n=0, 1, 2, 3$. One-shot multivibrator 106 receives the signal from threshold decider SE via conductor 108. One-shot 106 is triggered by the positive-going edge of the signal from threshold decider SE, and emits a short-duration pulse to counter 110. Counter 110 is a divide-by-four counter which has a two-bit output and which returns to zero after every fourth input pulse. The count of counter 110 determines which of the inputs to multiplexer 104 will be transferred to multiplier M and integration circuit I1 by way of conductor 112. This same signal is conveyed to output terminal 3 via conductor 114.

The present disclosure relates to the subject matter disclosed in Federal Republic of Germany application P 37 32 287.7 of Sept. 25th, 1987, the entire disclosure of which is incorporated herein by reference.

It will be understood that the above description of the present invention is susceptible to various modifications, changes, and adaptations, and the same are intended to be comprehended within the meaning and range of equivalents of the appended claims.

What we claim is:

1. A method for deriving the word timing of a pulse position modulated signal in which each word is divided into a plurality of time slots and a pulse occurs in any one of the time slots of each word, comprising the steps of:
   (a) generating a bipolar evaluation signal which begins in synchronism with any time slot of a word and which has a period corresponding to an even number multiple of the word length of the pulse position modulated signal;
   (b) repeatedly multiplying the evaluation signal with the pulse position modulated signal to provide a sequence of product signals, step (b) being conducted over a plurality of word lengths;
   (c) integrating each product signal to provide first integrated signals;
   (d) determining the absolute values of the first integrated signals;
   (e) integrating the absolute values of the first integrated signals to provide a second integrated signal;
   (f) comparing the second integrated signal to a threshold value;
   (g) shifting the evaluation signal by one time slot with respect to the pulse position modulated signal if the second integrated signal exceeds the threshold value, the evaluation signal being in synchronism with the word timing if the second integrated signal does not exceed the threshold value; and
   (h) if the evaluation signal was shifted in step (g), repeating steps (a) through (g) until the second integrated signal does not exceed the threshold value.

2. The method of claim 1, wherein step (b) comprises repeatedly multiplying the evaluation signal with the pulse position modulated signal over more word lengths than the absolute maximum number of identical words that can appear in immediate succession in the pulse position modulated signal.

3. The method of claim 1, wherein step (b) is conducted using analog multiplication.

4. A method for deriving the word timing of a pulse position modulated signal in which each word is divided into a plurality of time slots and a pulse occurs in any one of the time slots of each word, comprising the steps of:
   (a) generating a bipolar evaluation signal which begins in synchronism with any time slot of a word and which has a period corresponding to an even number multiple of the word length of the pulse position modulated signal;
   (b) repeatedly multiplying the evaluation signal with the pulse position modulated signal to provide a sequence of product signals, step (b) being conducted over a plurality of word lengths;
   (c) integrating each product signal to provide integrated signals;
   (d) comparing the integrated signals with a reference signal using a comparator;
   (e) counting the number of times an integrated signal exceeds the reference signal during step (b);
   (f) comparing the count obtained during step (e) to a threshold value;
   (g) shifting the evaluation signal by one time slot with respect to the pulse position modulated signal if the count exceeds the threshold value, the evaluation signal being in synchronism with the word timing if the count does not exceed the threshold value; and
   (h) if the evaluation signal was shifted in step (g), repeating steps (a) through (g) until the count does not exceed the threshold value.

5. A method for deriving the word timing of a pulse position modulated signal in which each word is divided into a plurality of time slots and a pulse occurs in any one of the time slots of each word, comprising the steps of:
   (a) generating a bipolar evaluation signal which begins in synchronism with any time slot of a word and which has a period corresponding to an even number multiple of the word length of the pulse position modulated signal;
   (b) performing the following sub-steps (b-1) through (b-4) in a plurality of parallel procedures
     (b-1) repeatedly multiplying the evaluation signal with the pulse position modulated signal to provide a sequence of product signals, sub-step (b-1) being conducted over a plurality of word lengths and being started at the beginning of a different time slot for each procedure,
     (b-2) integrating each product signal to provide first integrated signals,
     (b-3) determining the absolute values of the first integrated signals, and
     (b-4) integrating the absolute values of the first integrated signals to provide second integrated signals; and
   (c) comparing the second integrated signals in all procedures with one another, the evaluation signal which is employed in the procedure which produces the second integrated signal having the lowest level being in synchronism with the word timing of the pulse position modulated signal.

6. The method of claim 5, wherein sub-step (b-1) comprises repeatedly multiplying the evaluation signal with the pulse position modulated signal over more word lengths than the absolute maximum number of identical words that can appear in immediate succession in the pulse position modulated signal.

7. The method of claim 5, wherein sub-step (b-1) is conducted using analog multiplication.

8. A method for deriving the word timing of a pulse position modulated signal in which each word is divided into a plurality of time slots and a pulse occurs in any one of the time slots of each word, comprising:
   (a) generating a bipolar evaluation signal which begins in synchronism with any time slot of a word and which has a period corresponding to an even number multiple of the word length of the pulse position modulated signal;
   (b) performing the following sub-steps (b-1) through (b-4) in a plurality of parallel procedures (b-1) repeatedly multiplying the evaluation signal with the pulse position modulated signal to provide a sequence of product signals, sub-step (b-1) being conducted over a plurality of word lengths and being started at the begining of a different time slot for each procedure, (b-2) integrating each product signal to provide integrated signals, (b-3) comparing the integrated signals with a reference signal using a comparator, and (b-4) counting the number of times an integrated signal exceeds the reference signal during sub-step (b-1); and (c) comparing the counts obtained during sub-step (b-4) in the parallel procedures with one another, the evaluation signal employed in the procedure which produces the lowest count being in synchronism with the word timing of the pulse position modulated signal.

9. A circuit for deriving the word timing of a pulse position modulated signal in which each word is divided into a plurality of time slots and a pulse occurs in any one of the time slots of each word, comprising:

first means for generating a bipolar evaluation signal which begins in synchronism with any time slot of a word and which has a period corresponding to an even number multiple of the word length of the pulse position modulated signal, the first means including a pulse former circuit which is responsive to a slot timing signal;

second means for repeatedly multiplying the evaluation signal with the pulse position modulated signal to provide a sequence of product signals, the repeated multiplication extending over a plurality of word lengths, the second means including an analog multiplier having an output port and having a first input port which receives the evaluation signal;

third means for integrating each product signal to provide first integrated signals, the third means including an integration circuit which is connected to the output port of the multiplier to integrate the product signals;

fourth means for determining the absolute values of the first integrated signals;

fifth means for integrating the absolute values of the first integrated signals to provide a second integrated signal, the fifth means including another integration circuit, the another integration circuit having an output port;

sixth means for comparing the second integrated signal to a threshold value, the sixth means including a threshold decider connected to the output port of the another integration circuit;

seventh means for shifting the evaluation signal by one time slot with respect to the pulse position modulated signal if the second integrated signal exceeds the threshold value, the evaluation signal being in synchronism with the word timing if the second integrated signal does not exceed the threshold value, the seventh means including a delay circuit which is actuated by the threshold decider if the second integrated signal lies above the threshold value and which thereupon delays the evaluation signal by a period corresponding to one time slot of the pulse position modulated signal.

10. The circuit of claim 9, wherein the integration circuit included in the third means comprises two parallel integrators which alternatingly integrate product signals in the sequence.

11. A circuit for deriving the word timing of a pulse position modulated signal in which each word is divided into a plurality of time slots and a pulse occurs in any one of the time slots of each word, comprising:

first means for generating a bipolar evaluation signal which begins in synchronism with any time slot of a word and which has a period corresponding to an even number multiple of the word length of the pulse position modulated signal, the first means including a pulse former circuit which is responsive to a slot timing signal, the first means additionally including means for delaying the evaluation signal by integer multiples of the duration of a time slot of the pulse position modulated signal;

a plurality of parallel circuit branches, each circuit branch including second means for repeatedly multiplying the evaluation signal with a pulse position modulated signal to provide a sequence of product signals, the repeated multiplication extending over a plurality of word lengths, the second means including an analog multiplier having an output port and having a first input port which receives the pulse position modulated signal and a second input port which receives an evaluation signal from the first means, third means for integrating each product signal to provide first integrated signals, the third means including an integration circuit which is connected to the output port of the multiplier to multiply the product signals, fourth means for determining the absolute values of the first integrated signals, and fifth means for integrating the absolute values of the first integrated signals to provide a second integrated signal, the fifth means including another integration circuit, the another integration circuit having an output port, wherein the multiplier included in the second means of each circuit branch receives from the first means an evaluation signal which is delayed by a different integer multiple of the duration of a time slot, so that in each circuit branch the repeated multiplication by the second means thereof extends over a different portion of the pulse position modulated signal; and sixth means for comparing the second integrated signals provided by the fifth means of each circuit branch with one another, the sixth means including a comparison circuit which is connected to the output ports of the another integration circuits to determine which second integrated signal has the lowest level, the second integrated signal having the lowest level being in synchronism with the word timing of the pulse position modulated signal.

12. The circuit of claim 11, wherein for each of the parallel circuit branches the integration circuit included in the respective third means comprises two parallel integrators which alternatingly integrate product signals in the sequence.

* * * * *